(12) United States Patent
Yoo et al.

(10) Patent No.: US 11,809,802 B2
(45) Date of Patent: Nov. 7, 2023

(54) PROCESS MANUFACTURING METHOD, METHOD FOR ADJUSTING THRESHOLD VOLTAGE DEVICE, AND STORAGE MEDIUM

(71) Applicants: Semiconductor Manufacturing International (Shanghai) Corporation, Shanghai (CN); Semiconductor Manufacturing International (Beijing) Corporation, Beijing (CN)

(72) Inventors: Abraham Yoo, Shanghai (CN); Ying Jin, Shanghai (CN); Jisong Jin, Shanghai (CN)

(73) Assignees: Semiconductor Manufacturing International (Shanghai) Corporation, Shanghai (CN); Semiconductor Manufacturing International (Beijing) Corporation, Beijing (CN)

( * ) Notice: Subject to any disclaimer, the term of this patent is extended or adjusted under 35 U.S.C. 154(b) by 478 days.

(21) Appl. No.: 17/198,462

(22) Filed: Mar. 11, 2021

(65) Prior Publication Data

US 2021/0303768 A1 Sep. 30, 2021

(30) Foreign Application Priority Data

Mar. 31, 2020 (CN) .......................... 202010245619.4

(51) Int. Cl.
*G06F 30/398* (2020.01)
*H01L 21/321* (2006.01)
(Continued)

(52) U.S. Cl.
CPC .......... *G06F 30/398* (2020.01); *H01L 21/321* (2013.01); *H01L 29/401* (2013.01); *G06F 2119/18* (2020.01)

(58) Field of Classification Search
CPC .............................. G06F 30/398; H01L 21/321
(Continued)

(56) References Cited

U.S. PATENT DOCUMENTS

2006/0214207 A1* 9/2006 Nabatame ....... H01L 21/823842
257/E21.639
2011/0186931 A1* 8/2011 Marxsen ......... H01L 21/823842
257/E27.06
(Continued)

*Primary Examiner* — Suchin Parihar
(74) *Attorney, Agent, or Firm* — Crowell & Moring, LLP

(57) ABSTRACT

A process manufacturing method, a method for adjusting a threshold voltage, a device, and a storage medium are provided. One form of a process manufacturing method includes: determining a type of to-be-formed MOS device and a corresponding threshold voltage interval; obtaining, according to a MOS device type and the corresponding threshold voltage interval, a corresponding threshold voltage adjustment process by querying a pre-configured first mapping relationship of the threshold voltage interval and a second mapping relationship of the threshold voltage interval; and establishing a process flow according to the corresponding threshold voltage adjustment process, the first mapping relationship being a mapping relationship between the threshold voltage interval and the MOS device type; and the second mapping relationship being a correspondence between the threshold voltage interval in the first mapping relationship and a threshold voltage adjustment process formed by at least one adjustment process selected from a preset process flow, the threshold voltage adjustment process causing a threshold voltage to be in the corresponding threshold voltage interval under the action of a total threshold voltage offset. According to the present disclosure, the difficulty in adjusting the threshold voltage is reduced.

26 Claims, 2 Drawing Sheets

(51) Int. Cl.
  *H01L 29/40* (2006.01)
  *G06F 119/08* (2020.01)
  *G06F 119/18* (2020.01)
(58) Field of Classification Search
  USPC .......................................................... 716/132
  See application file for complete search history.

(56) References Cited

U.S. PATENT DOCUMENTS

| | | | | |
|---|---|---|---|---|
| 2013/0280873 | A1* | 10/2013 | Erben | H01L 29/66477 |
| | | | | 438/239 |
| 2014/0252487 | A1* | 9/2014 | Stephens | H01L 21/823842 |
| | | | | 257/368 |
| 2014/0264626 | A1* | 9/2014 | Yan | H01L 21/823462 |
| | | | | 257/411 |
| 2014/0319623 | A1* | 10/2014 | Tsai | H01L 21/823456 |
| | | | | 438/588 |
| 2019/0067457 | A1* | 2/2019 | More | H01L 29/66803 |
| 2021/0050225 | A1* | 2/2021 | Long | H01L 21/467 |
| 2023/0062482 | A1* | 3/2023 | Prasad | G06F 30/367 |
| 2023/0125896 | A1* | 4/2023 | Kim | H10B 12/05 |
| | | | | 257/296 |

* cited by examiner

PROCESS MANUFACTURING METHOD, METHOD FOR ADJUSTING THRESHOLD VOLTAGE DEVICE, AND STORAGE MEDIUM

RELATED APPLICATIONS

The present application claims priority to Chinese Patent Appln. No. 202010245619.4, filed Mar. 31, 2020, the entire disclosure of which is hereby incorporated by reference.

BACKGROUND

Technical Field

Embodiments of the present disclosure relate to the field of semiconductor manufacturing, and in particular, to a process manufacturing method, a method for adjusting a threshold voltage, a device, and a storage medium.

Related Art

A complementary metal-oxide-semiconductor (CMOS) transistor is an important element in an integrated circuit. The CMOS transistor includes a PMOS device and an NMOS device.

With a continuous decrease in feature sizes of a semiconductor structure, one challenging problem is how to alleviate the problem of a large leakage current of a semiconductor structure. The problem of the large leakage current of the semiconductor structure is mainly caused by a continuous decrease in a thickness of a conventional gate dielectric layer.

One solution is to replace a conventional silicon dioxide gate dielectric material with a high-k gate dielectric material, and use metal as a gate electrode, to avoid a Fermi level pinning effect and a boron penetration effect between the high-k material and a conventional gate electrode material.

To adjust a threshold voltage of the CMOS transistor, a work function layer is currently formed on a surface of the high-K gate dielectric layer. The work function layer of the PMOS device needs to have a higher work function, while the work function layer of the NMOS device needs to have a lower work function. Therefore, in the process of forming the PMOS device and the NMOS device, the work function layers corresponding to the PMOS device and the NMOS device are made of different materials to meet the requirements for respective work function adjustment.

SUMMARY

Embodiments and implementations of the present disclosure provide a process manufacturing method, a method for adjusting a threshold voltage, a device, and a storage medium, to reduce the difficulty in adjusting the threshold voltage.

To address the foregoing problem, one form of the present disclosure provides a process manufacturing method. One form of the method may include: determining a type of to-be-formed MOS device and a corresponding threshold voltage interval; obtaining, according to the MOS device type and the corresponding threshold voltage interval, a corresponding threshold voltage adjustment process by querying a pre-configured first mapping relationship of the threshold voltage interval and a second mapping relationship of the threshold voltage interval; establishing a process flow according to the corresponding threshold voltage adjustment process, where the first mapping relationship is a mapping relationship between the threshold voltage interval and the MOS device type, and the second mapping relationship is a correspondence between the threshold voltage interval in the first mapping relationship and a threshold voltage adjustment process formed by at least one adjustment process selected from a preset process flow, the threshold voltage adjustment process causing a threshold voltage to be in the corresponding threshold voltage interval under the action of a total threshold voltage offset.

Another form of the present disclosure further provides a method for adjusting a threshold voltage In one form, the method includes: setting at least one threshold voltage interval; establishing a first mapping relationship of the threshold voltage interval, the first mapping relationship being a mapping relationship between the threshold voltage interval and the MOS device type; setting a preset process flow, the preset process flow including adjustment processes performed during manufacturing of a MOS device, each of the adjustment processes having a corresponding threshold voltage offset; and establishing a second mapping relationship of the threshold voltage interval, the second mapping relationship being a correspondence between the threshold voltage interval in the first mapping relationship and a threshold voltage adjustment process formed by at least one adjustment process selected from the preset process flow, the threshold voltage adjustment process causing the threshold voltage to be in the corresponding threshold voltage interval under the action of a total threshold voltage offset.

Another form of the present disclosure further provides a device, including at least one memory and at least one processor, the memory storing one or more computer instructions, where the one or more computer instructions are executed by the processor to implement the foregoing process manufacturing method.

Yet another form of the present disclosure further provides a storage medium, the storage medium storing one or more computer instructions, the one or more computer instructions being used to implement the foregoing process manufacturing method.

In comparison to the prior art, technical solutions of the embodiments and implementations of the present disclosure have at least the following advantages.

In forms of the process manufacturing method provided in the embodiments and implementations of the present disclosure, according to the type of to-be-formed MOS device and the corresponding threshold voltage interval, a corresponding threshold voltage adjustment process is obtained by querying a pre-configured first mapping relationship of the threshold voltage interval and a second mapping relationship of the threshold voltage interval, and then a process flow is established according to the corresponding threshold voltage adjustment process. The first mapping relationship is a mapping relationship between the threshold voltage interval and the MOS device type, and the second mapping relationship is a correspondence between a threshold voltage interval in the first mapping relationship and a threshold voltage adjustment process formed by at least one adjustment process selected from a preset process flow, the threshold voltage adjustment process causing a threshold voltage to be in the corresponding threshold voltage interval under the action of a total threshold voltage offset. Therefore, the corresponding threshold voltage adjustment process may be obtained through querying, and the corresponding threshold voltage adjustment process may be obtained through a combination mode of different adjustment processes, so that any MOS device with required threshold voltages can be formed through the process manufacturing method, thereby further reducing the difficulty in adjusting the threshold voltage.

In forms of the method for adjusting the threshold voltage provided in the embodiments and implementations of the present disclosure, after at least one threshold voltage interval is set, a first mapping relationship of the threshold voltage interval is first established, the first mapping relationship being a mapping relationship between the threshold voltage interval and the MOS device type, and then a preset process flow is set, the preset process flow including adjustment processes performed during manufacturing of the MOS device, each of the adjustment processes having a corresponding threshold voltage offset. Then, a second mapping relationship of the threshold voltage interval is established, the second mapping relationship being a correspondence between the threshold voltage interval in the first mapping relationship and a threshold voltage adjustment process formed by at least one adjustment process selected from the preset process flow, the threshold voltage adjustment process causing the threshold voltage to be in the corresponding threshold voltage interval under the action of a total threshold voltage offset. Therefore, through the combination mode of different adjustment processes, threshold voltage adjustment processes corresponding to the MOS device type and the corresponding threshold voltage interval can be obtained to meet the requirements of forming a multi-threshold voltage device, thereby improving the applicability of the method for adjusting the threshold voltage and further reducing the difficulty in adjusting the threshold voltage.

DETAILED DESCRIPTION

With a continuous decrease in feature sizes of a semiconductor structure, the difficulty in adjusting a threshold voltage increases accordingly.

The reason for the difficulty in adjusting the threshold voltage increases is now analyzed in combination with a method for manufacturing a semiconductor structure.

Figure 1:
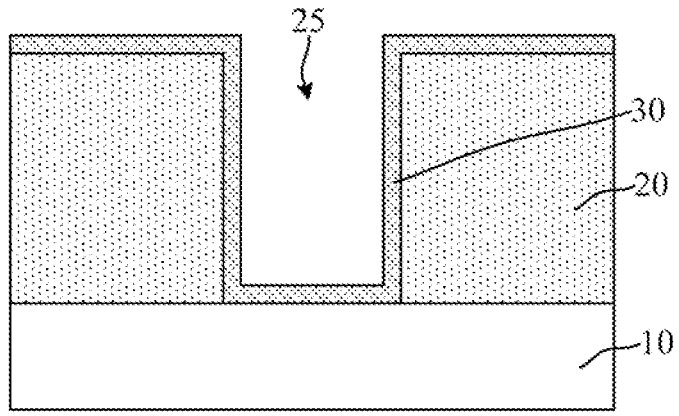
FIG. 1 to FIG. 2 are each a schematic structural diagram of steps in a method for manufacturing a semiconductor structure.
Figure 2:
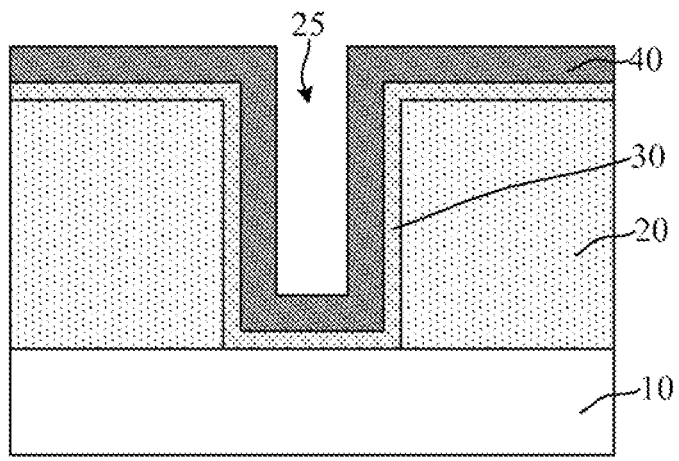

FIG. 1 to FIG. 2 are each a schematic structural diagram of steps in a method for manufacturing a semiconductor structure. Referring to FIG. 1, a base 10 is provided, an interlayer dielectric layer 20 being formed on the base 10, a gate opening 25 being formed in the interlayer dielectric layer 20.

The base 10 may include one or both of an NMOS region (not shown) and a PMOS region (not shown). The NMOS region may be used to form NMOS devices with different threshold voltages, and the PMOS region may be used to form PMOS devices with different threshold voltages.

In some implementations of a method for manufacturing the semiconductor structure, a gate structure is formed using a gatelast process, and the gate opening 25 is formed by removing a dummy gate structure.

Still referring to FIG. 1, a high-k gate dielectric layer 30 conformally covering the gate opening 25 is formed. Referring to FIG. 2, a work function layer 40 conformally covering the high-k gate dielectric layer 30 is formed.

A subsequent manufacturing process further includes: filling the gate opening 25, to form a gate electrode layer covering the work function layer 40; and removing, through a planarization process, the gate electrode layer, the work function layer 40, and the high-k gate dielectric layer 30 that are higher than a top surface of the interlayer dielectric layer 20, the gate electrode layer, the work function layer 40, and the high-k gate dielectric layer 30 remaining in the gate opening 25 being used to form a gate structure.

According to the type of to-be-formed MOS device and the corresponding threshold voltage, the work function layer 40 is a single-layer structure, or the work function layer 40 is a laminated structure, the work function layer 40 of the laminated structure including a plurality of work function material layers (not marked).

The work function layer 40 is configured to adjust the threshold voltage of the corresponding MOS device.

In order to meet the needs of switching speeds of different MOS devices in integrated circuit design, a MOS device with a multi-threshold voltage needs to be formed, resulting in an increase in the number of work function material layers included in the work function layer 40 of the laminated structure. In particular, when the method for manufacturing the semiconductor structure is used to form MOS devices of various threshold voltage types on the same substrate, more types of threshold voltages lead to a larger number of work function material layers included in the work function layer 40 of the laminated structure.

However, with a continuous decrease in feature sizes of the semiconductor structure, the size of the gate opening 25 decreases correspondingly. When the number of work function material layers included in the work function layer 40 of the laminated structure increases, the difficulty in forming the work function layer 40 in the gate opening 25 is accordingly increased.

Therefore, limited by the size of the gate opening 25, it is currently difficult to adjust the threshold voltage of the MOS device by adjusting the number of work function material layers included in the work function layer 40 in each gate opening 25, which correspondingly leads to greater difficulty in adjusting the threshold voltage.

To address the foregoing technical problem, one form of the present disclosure provides a process manufacturing method, including: determining a type of to-be-formed MOS device and a corresponding threshold voltage interval; obtaining, according to the MOS device type and the corresponding threshold voltage interval, a corresponding threshold voltage adjustment process by querying a pre-configured first mapping relationship of the threshold voltage interval and a second mapping relationship of the threshold voltage interval; establishing a process flow according to the corresponding threshold voltage adjustment process, where the first mapping relationship is a mapping relationship between the threshold voltage interval and the MOS device type, and the second mapping relationship is a correspondence between the threshold voltage interval in the first mapping relationship and a threshold voltage adjustment process formed by at least one adjustment process selected from a preset process flow, the threshold voltage adjustment process causing a threshold voltage to be in the corresponding threshold voltage interval under the action of a total threshold voltage offset.

In some implementations of the present disclosure, the corresponding threshold voltage adjustment process may be obtained through querying, and the corresponding threshold voltage adjustment process may be obtained through a combination mode of different adjustment processes, so that any MOS device with required threshold voltages can be formed through the process manufacturing method, thereby further reducing the difficulty in adjusting the threshold voltage.

Figure 3:
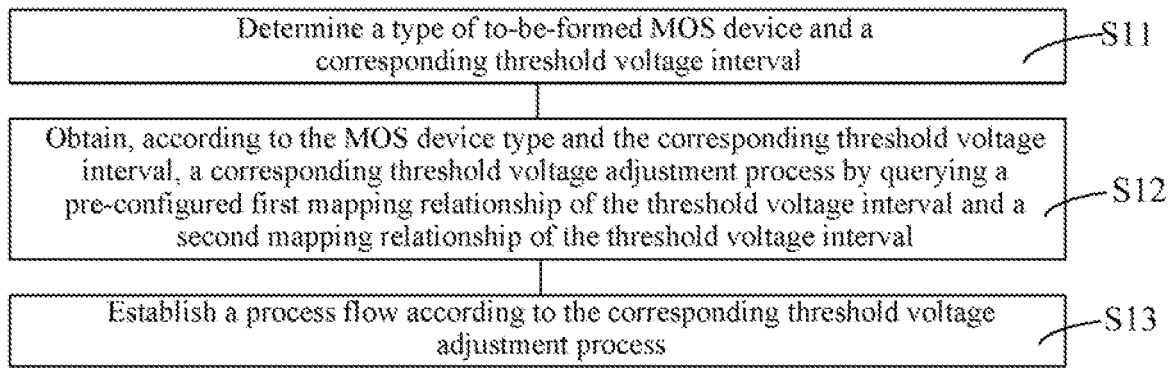
FIG. 3 is a flowchart of one form of a process manufacturing method according to the present disclosure.

Referring to FIG. 3, FIG. 3 is a flowchart of one form of a process manufacturing method according to the present disclosure. The process manufacturing method of this implementation includes the following basic steps.

Step S11: Determine a type of to-be-formed MOS device and a corresponding threshold voltage interval.

Step S12: Obtain, according to the MOS device type and the corresponding threshold voltage interval, a corresponding threshold voltage adjustment process by querying a pre-configured first mapping relationship of the threshold voltage interval and a second mapping relationship of the threshold voltage interval.

Step S13: Establish a process flow according to the corresponding threshold voltage adjustment process.

To make the foregoing objectives, features and advantages of the present disclosure easier to understand, the specific embodiments and implementations of the present disclosure are described in detail below with reference to the accompanying drawings.

Still referring to FIG. 3, step S11 of determining a type of to-be-formed MOS device and a corresponding threshold voltage interval is performed.

By first determining the type of to-be-formed MOS device and the corresponding threshold voltage interval, preparation is made for the subsequently obtaining the corresponding threshold voltage adjustment process.

In some implementations, the to-be-formed MOS device is a logic device, and the MOS device type includes one or two of an NMOS device and a PMOS device. For example, the process manufacturing method is used to form the NMOS device and the PMOS device on the same substrate, and the type of to-be-formed MOS device includes the NMOS device and the PMOS device.

In some implementations, the threshold voltage interval includes one or more of a first threshold voltage, a second threshold voltage, a third threshold voltage, a fourth threshold voltage, a fifth threshold voltage, a sixth threshold voltage, a seventh threshold voltage, and an eighth threshold voltage, threshold voltages corresponding to the first threshold voltage, the second threshold voltage, the third threshold voltage, the fourth threshold voltage, the fifth threshold voltage, the sixth threshold voltage, the seventh threshold voltage, and the eighth threshold voltage increasing progressively.

Still referring to FIG. 3, step S12 of obtaining, according to the MOS device type and the corresponding threshold voltage interval, a corresponding threshold voltage adjustment process by querying a pre-configured first mapping relationship of the threshold voltage interval and a second mapping relationship of the threshold voltage interval is performed.

The first mapping relationship is a mapping relationship between the threshold voltage interval and the MOS device type, and the second mapping relationship is a correspondence between the threshold voltage interval in the first mapping relationship and a threshold voltage adjustment process formed by at least one adjustment process selected from a preset process flow, the threshold voltage adjustment process causing the threshold voltage to be in the corresponding threshold voltage interval under the action of a total threshold voltage offset.

The first mapping relationship of the threshold voltage interval and the second mapping relationship of the threshold voltage interval are pre-configured. Therefore, once the MOS device type and the corresponding threshold voltage interval are determined, the corresponding threshold voltage adjustment process may be obtained through querying, thereby significantly reducing the difficulty in obtaining the corresponding threshold voltage adjustment process, and correspondingly reducing the difficulty in adjusting the threshold voltage.

In some implementations, both the NMOS device and the PMOS device have the same threshold voltage interval. For example, the threshold voltage intervals of the NMOS device and the PMOS device both include the first threshold voltage. Under the same threshold voltage interval, two sets of threshold voltage adjustment processes may be obtained. A set of threshold voltage adjustment process is used to adjust the threshold voltage of the NMOS device, and another set of threshold voltage adjustment process is used to adjust the threshold voltage of the PMOS device. Therefore, through the first mapping relationship, the threshold voltage adjustment process corresponding to the MOS device type and the corresponding threshold voltage interval can be obtained through querying, thereby implementing a one-to-one correspondence between the threshold voltage adjustment process and the MOS device type.

the second mapping relationship is a correspondence between the threshold voltage interval in the first mapping relationship and a threshold voltage adjustment process formed by at least one adjustment process selected from a preset process flow, the threshold voltage adjustment process causing a threshold voltage to be in the corresponding threshold voltage interval under the action of a total threshold voltage offset. Therefore, the threshold voltage adjustment process corresponding to the MOS device type and the corresponding threshold voltage interval may be obtained through querying to meet the requirements of forming a multi-threshold voltage device.

Each of the adjustment processes has a corresponding threshold voltage offset. Therefore, in each set of threshold voltage adjustment processes, under the combined action of the adjustment processes, the threshold voltage adjustment process causes the threshold voltage to be in the corresponding threshold voltage interval under the action of the total threshold voltage offset.

In some implementations, in the second mapping relationship of the threshold voltage interval, the adjustment process includes an electric dipole layer forming process, a work function layer forming process, and a work function layer plasma treatment process. The electric dipole layer forming process, the work function layer forming process, and the work function layer plasma treatment process all have threshold voltage offsets, thereby playing a role in adjusting the threshold voltage of the MOS device.

When a MOS device is formed using forms of the process manufacturing method, before the threshold voltage adjustment process is performed, an interface layer (IL) forming process and a high-k gate dielectric layer forming process that are sequentially performed are usually included. The electric dipole layer forming process includes the step of forming an oxide layer on the high-k gate dielectric layer, an annealing step, and the step of removing the oxide layer. In the annealing process, ions in the oxide layer diffuse to the interface of the interface layer and the high-k gate dielectric layer, and are precipitated at the interface of the interface layer and the high-k gate dielectric layer, thereby forming an electric dipole layer. In addition, the oxide layer is also removed after the electric dipole layer is formed. Therefore, the electric dipole layer forming process is used, to prevent an additional deposited film layer from being introduced into a metal gate structure, that is, the laminated structure corresponding to the metal gate structure is not affected.

In some implementations, when the MOS device is the NMOS device, in the electric dipole layer forming process, the threshold voltage is adjusted by using a magnesium oxide layer or a lanthanum oxide layer. In other words, the oxide layer is made of the magnesium oxide layer or the lanthanum oxide layer. When the MOS device is the PMOS device, in the electric dipole layer forming process, the threshold voltage is adjusted by using an aluminum oxide layer. In other words, the oxide layer is made of aluminum oxide.

The electric dipole layer forming process is used to reduce the overall work function of the metal gate structure, and a smaller work function value leads to a smaller threshold voltage of the NMOS device and a larger threshold voltage of the PMOS device. Therefore, in some implementations, the electric dipole layer forming process is used to reduce the threshold voltage of the NMOS device, and the dipole layer forming process is used to increase the threshold voltage of the PMOS device.

By forming an electric dipole layer at the interface of the interface layer and the high-k gate dielectric layer, the electric dipole layer will generate an electric field in a same direction in which an electron moves, thereby forming a sudden electric field change at the interface, and further changing the overall work function value of the device.

The work function layer plasma treatment process is used for performing plasma treatment on the work function layer, thereby changing the work function value of the work function layer and further playing a role in adjusting the threshold voltage, and the work function layer plasma treatment neither affects the thickness of the work function layer nor introduces additional deposited film layers.

In some implementations, the work function layer plasma treatment process is used to increase the work function value of the work function layer. In the work function layer plasma treatment process, the threshold voltage is adjusted through plasma treatment under the condition of one or more reaction gases such as a nitrogen-containing gas, an oxygen-containing gas, and a fluorine-containing gas. The nitrogen-containing gas may be $N_2$, $NH_3$, or $N_2O$, the oxygen-containing gas may be $O_2$ or $NO_2$, and the fluorine-containing gas may be $F_2$. It should be noted that, in the work function layer plasma treatment process, a non-reactive gas such as an argon gas is also used to prevent vigorous plasma reaction.

Specifically, the work function layer plasma treatment is used to modify the material of the work function layer, thereby changing the work function value of the work function layer. For example, an oxygen-containing gas is used to perform work function layer plasma treatment on a work function layer made of TiN, so that the work function layer is made of TiON instead of TiN, thereby changing the work function value thereof.

Based on the above, by making the adjustment process include an electric dipole layer forming process, a work function layer forming process, and a work function layer plasma treatment process, a combination mode of different adjustment processes can be used to form a MOS device corresponding to the threshold voltage interval, thereby improving the applicability of the method for adjusting the threshold voltage, and further reducing the difficulty in adjusting the threshold voltage. In addition, neither the electric dipole layer forming process nor the work function layer plasma treatment process may introduce additional deposited film layers into the metal gate structure, thereby reducing the complexity of the laminated structure corresponding to the metal gate structure and correspondingly meeting the requirement of continuously reducing the device feature size.

In particular, currently, a gatelast process is generally used to form the metal gate structure, that is, the metal gate structure is formed in the gate opening in the interlayer dielectric layer. The adjustment process includes an electric dipole layer forming process, a work function layer forming process, and the work function layer plasma treatment process, correspondingly reducing the difficulty in forming the laminated structure corresponding to the metal gate structure in the gate opening.

In some implementations, the adjustment process in the preset process flow includes: the electric dipole layer forming process, a first N-type work function layer forming process, a first P-type work function layer forming process, a second P-type work function layer forming process, a P-type work function layer plasma treatment process, a second N-type work function layer forming process, and an N-type work function layer plasma treatment process, the first N-type work function layer forming process, the first P-type work function layer forming process, the second P-type work function layer forming process, and the second N-type work function layer forming process serving as the work function layer forming process, and the P-type work function layer plasma treatment process and the N-type work function layer plasma treatment process serving as the work function layer plasma treatment process.

Correspondingly, the P-type work function layer plasma treatment process is used to perform plasma treatment on the first P-type work function layer or the second P-type work function layer, and the N-type work function layer plasma treatment process is used to perform plasma treatment on the second N-type work function layer.

In the preset process flow, the electric dipole layer forming process, the first N-type work function layer forming process, the first P-type work function layer forming process, the second P-type work function layer forming process, the P-type work function layer plasma treatment process, the second N-type work function layer forming process, and the N-type work function layer plasma treatment process are sequentially performed.

In some implementations, the first N-type work function layer forming process and the first N-type work function layer forming process are both used to form an N-type work function layer. A work function range of the material of the N-type work function layer is from 3.9 ev to 4.5 ev, for example, 4 ev, 4.1 ev, or 4.3 ev. The N-type work function layer is made of one or more of TiAl, Mo, MoN, AlN, and TiAlC.

In some implementations, the first P-type work function layer forming process and the first P-type work function layer forming process are both used to form a P-type work function layer. A work function range of the material of the P-type work function layer is from 5.1 ev to 5.5 ev, for example, 5.2 ev, 5.3 ev, or 5.4 ev. The P-type work function layer is made of one or more of TiN, TaN, TaSiN, TaAlN, or TiAlN.

The N-type work function layer plasma treatment process is used to increase the work function value of the N-type work function layer, thereby increasing the threshold voltage of the NMOS device. The P-type work function layer plasma treatment process is used to increase the work function value of the P-type work function layer, thereby reducing the threshold voltage of the PMOS device, so that the threshold voltage of the NMOS device can also be accordingly increased.

Referring to Table 1, a pre-configured first mapping relationship of the threshold voltage interval and a second mapping relationship of the threshold voltage interval are shown.

old voltage interval corresponding to the NMOS device is a fourth threshold voltage, the corresponding threshold voltage adjustment process includes the electric dipole layer forming process, the first P-type work function layer forming process, the second N-type work function layer forming process, and the N-type work function layer plasma treatment process. When a threshold voltage interval corresponding to the NMOS device is a fifth threshold voltage, the corresponding threshold voltage adjustment process includes the first P-type work function layer forming process and the second N-type work function layer forming process.

TABLE 1

| Preset process | MOS device type | | | | | | | | | | | | | | | |
|---|---|---|---|---|---|---|---|---|---|---|---|---|---|---|---|---|
| | NMOS | | | | | | | | PMOS | | | | | | | |
| Dipole | ○1 | ○1 | ○1 | ○1 | X | X | X | X | X | ○2 | X | ○2 | X | ○2 | X | ○2 |
| ESL (NWF-1) | ○ | ○ | X | X | X | X | X | X | X | X | X | X | X | X | X | X |
| PWF-1 | X | X | ○ | ○ | ○ | ○ | ○ | ○ | ○ | ○ | ○ | ○ | ○ | ○ | ○ | ○ |
| PWF-2 | X | X | X | X | X | X | X | X | ○ | ○ | ○ | ○ | X | X | X | X |
| plasma-1 | X | X | X | X | X | X | ○ | ○ | ○ | ○ | X | X | ○ | ○ | X | X |
| NWF-2 | ○ | ○ | ○ | ○ | ○ | ○ | ○ | ○ | Δ | Δ | Δ | Δ | Δ | Δ | Δ | Δ |
| plasma-2 | X | ○ | X | ○ | X | ○ | X | ○ | X | X | X | X | X | X | X | X |
| Threshold voltage interval | ESLVT | SLVT | ULVT | LVT | SVT | HVT | UHVT | SHVT | ESLVT | SLVT | ULVT | LVT | SVT | HVT | UHVT | SHVT |

It should be noted that "O" in Table 1 indicates a selected adjustment process in the second mapping relationship, "X" in Table 1 indicates an unselected adjustment process in the second mapping relationship, "O1" and "O2" in Table 1 indicate different doping layer thicknesses of the electric dipole layer forming processes corresponding to an NMOS and a PMOS, and "Δ" in Table 1 indicates either selected or unselected adjustment processes in the second mapping relationship.

It should be further noted that "Dipole" in Table 1 indicates an electric dipole layer forming process, "ESL (NWF-1)" indicates a first N-type work function layer forming process, "PWF-1" indicates a first P-type work function layer forming process, "PWF-2" indicates a second P-type work function layer forming process, "plasma-1" indicates a P-type work function layer plasma treatment process, "NWF-2" indicates a second N-type work function layer forming process, and "plasma-2" indicates an N-type work function layer plasma treatment process.

It may be learned from Table 1 that, when the MOS device is the NMOS device, and a threshold voltage interval corresponding to the NMOS device is a first threshold voltage, the corresponding threshold voltage adjustment process includes the electric dipole layer forming process, the first N-type work function layer forming process, and the second N-type work function layer forming process. When the MOS device is the NMOS device, and a threshold voltage interval corresponding to the NMOS device is a second threshold voltage, the corresponding threshold voltage adjustment process includes the electric dipole layer forming process, the first N-type work function layer forming process, the second N-type work function layer forming process, and the N-type work function layer plasma treatment process. When a threshold voltage interval corresponding to the NMOS device is a third threshold voltage, the corresponding threshold voltage adjustment process includes the electric dipole layer forming process, the first P-type work function layer forming process, and the second N-type work function layer forming process. When a thresh- When a threshold voltage interval corresponding to the NMOS device is a sixth threshold voltage, the corresponding threshold voltage adjustment process includes the first P-type work function layer forming process, the second N-type work function layer forming process, and the N-type work function layer plasma treatment process. When a threshold voltage interval corresponding to the NMOS device is a seventh threshold voltage, the corresponding threshold voltage adjustment process includes the first P-type work function layer forming process, the P-type work function layer plasma treatment process, and the N-type work function layer forming process. When a threshold voltage interval corresponding to the NMOS device is an eighth threshold voltage, the corresponding threshold voltage adjustment process includes the first P-type work function layer forming process, the P-type work function layer plasma treatment process, the second N-type work function layer forming process, and the N-type work function layer plasma treatment process.

It should be noted that the threshold voltage adjustment process corresponding to the first threshold voltage in the NMOS device includes the electric dipole layer forming process, the first N-type work function layer forming process, and the second N-type work function layer forming process, and does not include the first P-type work function layer forming process and the second N-type work function layer forming process. Therefore, during subsequent manufacturing by using the process flow, after the first P-type work function layer covering the entire substrate is formed, a first P-type work function layer at a region position used for forming an NMOS device and having a threshold voltage interval of the first threshold voltage is removed through mask etching. In the etching process, the N-type work function layer formed by using the first N-type work function layer forming process serves as an etch stop layer (ESL).

Similarly, after the second P-type work function layer covering the entire substrate is formed, a second P-type work function layer at a region position used for forming an NMOS device and having a threshold voltage interval of the first threshold voltage is removed through mask etching. In the etching process, the N-type work function layer formed by using the first N-type work function layer forming process serves as the etch stop layer.

Similarly, a threshold voltage adjustment process corresponding to the second threshold voltage in the NMOS device includes the electric dipole layer forming process, the first N-type work function layer forming process, and the second N-type work function layer forming process, and the N-type work function layer formed by using the first N-type work function layer forming process also serves as the etch stop layer.

It may be learned from Table 1 that, when the MOS device is the PMOS device, and a threshold voltage interval corresponding to the PMOS device is the first threshold voltage, the corresponding threshold voltage adjustment process includes the first P-type work function layer forming process, the second P-type work function layer forming process, and the P-type work function layer plasma treatment process. When a threshold voltage interval corresponding to the PMOS device is the second threshold voltage, the corresponding threshold voltage adjustment process includes the electric dipole layer forming process, the first P-type work function layer forming process, the second P-type work function layer forming process, and the P-type work function layer plasma treatment process. When a threshold voltage interval corresponding to the PMOS device is the third threshold voltage, the corresponding threshold voltage adjustment process includes the first P-type work function layer forming process and the second P-type work function layer forming process. When a threshold voltage interval corresponding to the PMOS device is the fourth threshold voltage, the corresponding threshold voltage adjustment process includes the electric dipole layer forming process, the first P-type work function layer forming process, and the second P-type work function layer forming process. When a threshold voltage interval corresponding to the PMOS device is the fifth threshold voltage, the corresponding threshold voltage adjustment process includes the first P-type work function layer forming process and the P-type work function layer plasma treatment process. When a threshold voltage interval corresponding to the PMOS device is the sixth threshold voltage, the corresponding threshold voltage adjustment process includes the electric dipole layer forming process, the first P-type work function layer forming process, and the P-type work function layer plasma treatment process. When a threshold voltage interval corresponding to the PMOS device is the seventh threshold voltage, the corresponding threshold voltage adjustment process includes the first P-type work function layer forming process. When a threshold voltage interval corresponding to the PMOS device is the eighth threshold voltage, the corresponding threshold voltage adjustment process includes the electric dipole layer forming process and the first P-type work function layer forming process.

It should be noted that the foregoing threshold voltage adjustment process is obtained when the substrate of the MOS device is made of Si. When the substrate of the PMOS device is made of SiGe, the threshold voltage of the PMOS device will integrally decrease. Therefore, in order to make the threshold voltage adjustment process cause, under the action of the total threshold voltage offset, the threshold voltage of the PMOS device to be in the corresponding threshold voltage interval, the threshold voltage adjustment process corresponding to the PMOS device further includes the second N-type work function layer forming process, that is, the threshold voltage adjustment process corresponding to each threshold voltage interval includes the second N-type work function layer forming process. The threshold voltage adjustment process corresponding to the PMOS device further includes the second N-type work function layer forming process, to increase the work function value of the PMOS device, thereby reducing the threshold voltage.

Correspondingly, when the substrate of the PMOS device is made of Si, the second N-type work function layer forming process does not need to be selected in the step of obtaining the corresponding threshold voltage adjustment process by querying the pre-configured first mapping relationship of the threshold voltage interval and the second mapping relationship of the threshold voltage interval.

Therefore, for the PMOS device, the second N-type work function layer forming process may serve as the selected adjustment process, or may serve as the unselected adjustment process.

Still referring to FIG. 3, step S13 of establishing a process flow according to the corresponding threshold voltage adjustment process is performed.

The process flow is established according to the corresponding threshold voltage adjustment process, thereby preparing for subsequently forming a to-be-formed MOS device on the same substrate through the established process flow.

In the foregoing step S12, the second mapping relationship is a correspondence between the threshold voltage interval in the first mapping relationship and a threshold voltage adjustment process formed by at least one adjustment process selected from a preset process flow, and therefore the process flow includes adjustment processes corresponding to all threshold voltage adjustment processes.

Referring to Table 1, as an example, when the type of to-be-formed MOS device includes an NMOS device and a PMOS device, and when threshold voltage intervals of the NMOS device and the PMOS device both include a first threshold voltage, a second threshold voltage, a third threshold voltage, a fourth threshold voltage, a fifth threshold voltage, a sixth threshold voltage, a seventh threshold voltage, and an eighth threshold voltage, the process flow includes an electric dipole layer forming process, a first N-type work function layer forming process, a first P-type work function layer forming process, a second P-type work function layer forming process, a P-type work function layer plasma treatment process, a second N-type work function layer forming process, and an N-type work function layer plasma treatment process that are sequentially formed.

In some other implementations, when the threshold voltage interval of the NMOS device does not include the first threshold voltage and the second threshold voltage, the process flow does not include the first N-type work function layer forming process.

Correspondingly, during subsequent manufacturing by using the process flow, a mask is used to perform a corresponding adjustment process on each threshold voltage interval.

As an example, when the first N-type work function layer is subsequently formed, after the first N-type work function layer covering the entire substrate is formed, the first N-type work function layer is etched by using the mask, to retain the first N-type work function layer at a region position for forming an NMOS device and having a threshold voltage interval including the first threshold voltage and the second threshold voltage, and the first N-type work function layer at other region positions is removed.

In some implementations, in the step of establishing a process flow, the process flow further includes an interface layer forming process and a high-k gate dielectric layer forming process that are sequentially performed, the high-k gate dielectric layer forming process being performed before the adjustment process. The electric dipole layer forming process is used to dope ions into the high-k gate dielectric layer to form an electric dipole layer at the interface between the interface layer and the high-k gate dielectric layer.

In some implementations, in the step of establishing a process flow, the process flow further includes a gate electrode layer forming process, the gate electrode layer forming process being performed after the adjustment process.

Correspondingly, the present disclosure further provides a method for adjusting a threshold voltage.

Figure 4:
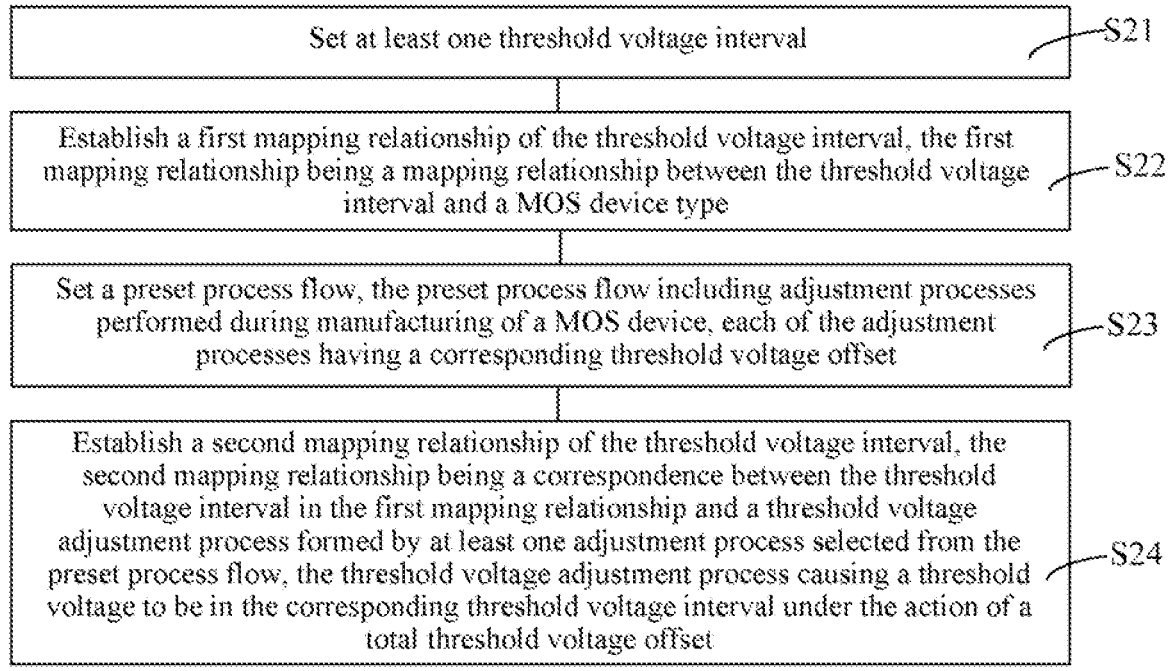
FIG. 4 is a flowchart of one form of a method for adjusting a threshold voltage according to the present disclosure.

Referring to FIG. 4, FIG. 4 is a flowchart of one form of a method for adjusting a threshold voltage according to the present disclosure. Implementations of the method for adjusting a threshold voltage of this embodiment includes the following basic steps.

Step S21: Set at least one threshold voltage interval.

Step S22: Establish a first mapping relationship of the threshold voltage interval, the first mapping relationship being a mapping relationship between the threshold voltage interval and a MOS device type.

Step S23: Set a preset process flow, the preset process flow including adjustment processes performed during manufacturing of a MOS device, each of the adjustment processes having a corresponding threshold voltage offset.

Step S24: Establish a second mapping relationship of the threshold voltage interval, the second mapping relationship being a correspondence between the threshold voltage interval in the first mapping relationship and a threshold voltage adjustment process formed by at least one adjustment process selected from the preset process flow, the threshold voltage adjustment process causing the threshold voltage to be in the corresponding threshold voltage interval under the action of a total threshold voltage offset.

Referring to FIG. 4, step S21 of setting at least one threshold voltage interval is performed.

By setting at least one threshold voltage interval, preparation is made for the subsequent configuration of the first mapping relationship of the threshold voltage interval and the second mapping relationship of the threshold voltage interval, and during the subsequent process manufacturing, the corresponding threshold voltage adjustment process can be obtained by querying the pre-configured first mapping relationship of the threshold voltage interval and the second mapping relationship of the threshold voltage interval.

The first mapping relationship is a mapping relationship between the threshold voltage interval and the MOS device type, and the second mapping relationship is a correspondence between the threshold voltage interval in the first mapping relationship and a threshold voltage adjustment process formed by at least one adjustment process selected from a preset process flow, the threshold voltage adjustment process causing the threshold voltage to be in the corresponding threshold voltage interval under the action of a total threshold voltage offset.

In some implementations, there are a plurality of threshold voltage intervals, thereby increasing the subsequent amount of information included in the first mapping relationship of the threshold voltage interval and the second mapping relationship of the threshold voltage interval. Accordingly, during the subsequent process manufacturing, any MOS device type and the threshold voltage adjustment process corresponding to the corresponding threshold voltage interval can be obtained by querying the first mapping relationship of the threshold voltage interval and the second mapping relationship of the threshold voltage interval that are configured In some implementations, thereby improving the applicability of the method for adjusting the threshold voltage.

Accordingly, the step of setting the plurality of threshold voltage intervals includes: for the same MOS device type of MOS devices, providing a total threshold voltage interval of the MOS device; and dividing the total threshold voltage interval into a plurality of subintervals, the subintervals being in a one-to-one correspondence with the threshold voltage interval.

In some implementations, the MOS device is a logic device, and the MOS device type includes an NMOS device and a PMOS device. A total threshold voltage interval of the NMOS device is 30 mV to 200 mV, and an absolute value of the total threshold voltage interval of the PMOS device ranges from 30 mV to 200 mV. It should be noted that the threshold voltage of the PMOS is a negative value, and a smaller threshold voltage of the PMOS leads to a smaller absolute value of the threshold voltage of the PMOS.

It should be noted that, for the same MOS device type of MOS device, the number of the threshold voltage intervals should be neither too small nor too large. If the number of the threshold voltage intervals is too small, the method for adjusting the threshold voltage has low accuracy, and during subsequent process manufacturing, a corresponding threshold voltage adjustment process is not easily obtained according to the type of to-be-formed MOS device and the corresponding threshold voltage interval by querying the first mapping relationship of the threshold voltage interval and the second mapping relationship of the threshold voltage interval configured In some implementations, thereby reducing the applicability of the method for adjusting the threshold voltage. If the number of the threshold voltage intervals is too large, the complexity of the method for adjusting the voltage may be correspondingly increased. Moreover, if a threshold voltage difference between adjacent threshold voltage intervals is too small, it is difficult to accurately adjust the threshold voltage of the MOS device into the corresponding threshold voltage interval through the corresponding threshold voltage adjustment process under the influence of process variation. Therefore, it is unnecessary to set an excessive number of threshold voltage intervals.

To this end, in some implementations, there are 8 to 16 threshold voltage intervals. The absolute value of the total threshold voltage interval of PMOS devices usually ranges from 30 mV to 200 mV, and the total threshold voltage interval of the NMOS device usually ranges from 30 mV to 200 mV. Therefore, by setting the number of the threshold voltage intervals to 8 to 16, the threshold voltage interval can cover most or all MOS devices, that is, the applicability of the method for adjusting the threshold voltage in this embodiment is ensured.

In some implementations, for the same MOS device type of MOS device, there are 8 threshold voltage intervals. The threshold voltage intervals include a first threshold voltage, a second threshold voltage, a third threshold voltage, a fourth threshold voltage, a fifth threshold voltage, a sixth threshold voltage, a seventh threshold voltage, and an eighth threshold voltage, threshold voltages corresponding to the first threshold voltage, the second threshold voltage, the third threshold voltage, the fourth threshold voltage, the fifth threshold voltage, the sixth threshold voltage, the seventh threshold voltage, and the eighth threshold voltage increasing progressively.

Still referring to FIG. 4, step S22 of establishing a first mapping relationship of the threshold voltage interval is performed, the first mapping relationship being a mapping relationship between the threshold voltage interval and a MOS device type.

Both the NMOS device and the PMOS device have the same threshold voltage interval. For example, the threshold voltage intervals of the NMOS device and the PMOS device both include the first threshold voltage. The second mapping relationship of the threshold voltage interval is to be established subsequently, the second mapping relationship being a correspondence between the threshold voltage interval in the first mapping relationship and a threshold voltage adjustment process formed by at least one adjustment process selected from the preset process flow, the threshold voltage adjustment process causing the threshold voltage to be in the corresponding threshold voltage interval under the action of a total threshold voltage offset. Therefore, a same threshold voltage interval corresponds to two sets of threshold voltage adjustment processes, one set of threshold voltage adjustment processes being used to adjust the threshold voltage of the NMOS device, and the other set of threshold voltage adjustment processes being used to adjust the threshold voltage of the PMOS device. Therefore, through the first mapping relationship, a one-to-one correspondence between the threshold voltage adjustment process and the MOS device type is implemented.

In some implementations, the MOS device type includes an NMOS device and a PMOS device. Therefore, in the first mapping relationship, the NMOS device has a corresponding threshold voltage interval, and the PMOS device also has a corresponding threshold voltage interval.

Specifically, the threshold voltage interval of the NMOS device includes a first threshold voltage, a second threshold voltage, a third threshold voltage, a fourth threshold voltage, a fifth threshold voltage, a sixth threshold voltage, a seventh threshold voltage, and an eighth threshold voltage, and the threshold voltage interval of the PMOS device also includes a first threshold voltage, a second threshold voltage, a third threshold voltage, a fourth threshold voltage, a fifth threshold voltage, a sixth threshold voltage, a seventh threshold voltage, and an eighth threshold voltage.

Still referring to FIG. 4, step S23 of setting a preset process flow is performed, the preset process flow including adjustment processes performed during manufacturing of a MOS device, each of the adjustment processes having a corresponding threshold voltage offset.

The step of setting the preset process flow is used for preparing for the subsequently establishing the second mapping relationship of the threshold voltage interval.

The preset process flow includes an adjustment process performed during manufacturing of the MOS device, that is, the preset process flow includes all optional adjustment processes, so that at least one adjustment process is subsequently selected from the preset process flow to form a threshold voltage adjustment process corresponding to the threshold voltage interval in the first mapping relationship.

In some implementations, in the step of setting the preset process flow, the adjustment process is divided into a first type adjustment process and a second type adjustment process, a threshold voltage offset corresponding to the first type adjustment process being greater than a threshold voltage offset corresponding to the second type adjustment process.

When the second mapping relationship of the threshold voltage interval is subsequently established, the threshold voltage adjustment process makes the threshold voltage in the corresponding threshold voltage interval under the action of the total threshold voltage offset, so that the coarse adjustment of the threshold voltage can be implemented through the first type adjustment process, and the fine adjustment of the threshold voltage can be implemented through the second type adjustment process, thereby reducing the difficulty of the method for adjusting the threshold voltage.

In order to implement the coarse adjustment of the threshold voltage through the first type adjustment process and the fine adjustment of the threshold voltage through the second type adjustment process, and in comprehensive consideration of the total threshold voltage interval and the threshold voltage interval of the MOS device, the threshold voltage offset of the first type adjustment process ranges from 150 mV to 350 mV, and the threshold voltage offset of the second type adjustment process ranges from 40 mV to 140 mV.

Specifically, the first type adjustment process includes an electric dipole layer forming process, and the second type adjustment process includes a work function layer forming process and a work function layer plasma treatment process. The electric dipole layer forming process, the work function layer forming process, and the work function layer plasma treatment process all have corresponding threshold voltage offsets, thereby playing a role in adjusting the threshold voltage of the MOS device.

During the process manufacturing, before the threshold voltage adjustment process is performed, an interface layer forming process and a high-k gate dielectric layer forming process that are performed in sequence are further included. The electric dipole layer forming process includes the step of doping ions into the high-k gate dielectric layer and an annealing step. During the annealing process, the doped ions are precipitated at the interface of the interface layer and the high-k gate dielectric layer, thereby forming a dipole layer. Therefore, the electric dipole layer forming process is used, to prevent an additional deposited film layer from being introduced into a metal gate structure, that is, the laminated structure corresponding to the metal gate structure is not affected.

In some implementations, when the MOS device is the NMOS device, in the electric dipole layer forming process, the threshold voltage is adjusted by using a magnesium oxide layer or a lanthanum oxide layer. In other words, the oxide layer is made of the magnesium oxide layer or the lanthanum oxide layer. When the MOS device is the PMOS device, in the electric dipole layer forming process, the threshold voltage is adjusted by using an aluminum oxide layer. In other words, the oxide layer is made of aluminum oxide.

The electric dipole layer forming process is used to reduce the overall work function of the metal gate structure, and a smaller work function value leads to a smaller threshold voltage of the NMOS device and a larger threshold voltage of the PMOS device. Therefore, in some implementations, the dipole layer forming process is used to reduce the threshold voltage of the NMOS device, and the dipole layer forming process is used to increase the threshold voltage of the PMOS device.

By forming an electric dipole layer at the interface of the interface layer and the high-k gate dielectric layer, the electric dipole layer will generate an electric field in a same direction in which an electron moves, thereby forming a sudden change in the electric field at the interface, and further changing the overall work function value of the device.

The work function layer plasma treatment process is used for performing plasma treatment on the work function layer, thereby changing the work function value of the work function layer and further playing a role in adjusting the threshold voltage, and the work function layer plasma treatment neither affects the thickness of the work function layer nor introduces additional deposited film layers.

In some implementations, the work function layer plasma treatment process is used to increase the work function value of the work function layer. In the work function layer plasma treatment process, the threshold voltage is adjusted through plasma treatment under the condition of one or more of a nitrogen-containing gas, an oxygen-containing gas, and a fluorine-containing gas. The nitrogen-containing gas may be $N_2$, $NH_3$, or $N_2O$, the oxygen-containing gas may be $O_2$ or $NO_2$, and the fluorine-containing gas may be $F_2$. It should be noted that, in the work function layer plasma treatment process, a non-reactive gas such as an argon gas is also used to prevent vigorous plasma reaction.

Specifically, the work function layer plasma treatment is used to modify the material of the work function layer, thereby changing the work function value of the work function layer. For example, an oxygen-containing gas is used to perform work function layer plasma treatment on a work function layer made of TiN, so that the work function layer is made of TiON instead of TiN, thereby changing the work function value thereof.

Based on the above, by making the adjustment process include an electric dipole layer forming process, a work function layer forming process, and a work function layer plasma treatment process, a combination mode of different adjustment processes can be used to form a MOS device corresponding to the threshold voltage interval, thereby improving the applicability of the method for adjusting the threshold voltage, and further reducing the difficulty in adjusting the threshold voltage. In addition, neither the electric dipole layer forming process nor the work function layer plasma treatment process may introduce additional deposited film layers into the metal gate structure, thereby reducing the complexity of the laminated structure corresponding to the metal gate structure and correspondingly meeting the requirement of continuously reducing the device feature size.

In particular, currently, a gatelast process is generally used to form the metal gate structure, that is, the metal gate structure is formed in the gate opening in the interlayer dielectric layer. The adjustment process includes an electric dipole layer forming process, a work function layer forming process, and the work function layer plasma treatment process, correspondingly reducing the difficulty in forming the laminated structure corresponding to the metal gate structure in the gate opening.

In some implementations, the adjustment process in the preset process flow includes: the electric dipole layer forming process, a first N-type work function layer forming process, a first P-type work function layer forming process, a second P-type work function layer forming process, a P-type work function layer plasma treatment process, a second N-type work function layer forming process, and an N-type work function layer plasma treatment process. The first N-type work function layer forming process, the first P-type work function layer forming process, the second P-type work function layer forming process, and the second N-type work function layer forming process serve as the work function layer forming process, and the P-type work function layer plasma treatment process and the N-type work function layer plasma treatment process serve as the work function layer plasma treatment process.

Correspondingly, the P-type work function layer plasma treatment process is used to perform plasma treatment on the first P-type work function layer or the second P-type work function layer, and the N-type work function layer plasma treatment process is used to perform plasma treatment on the second N-type work function layer.

In the preset process flow, the electric dipole layer forming process, the first N-type work function layer forming process, the first P-type work function layer forming process, the second P-type work function layer forming process, the P-type work function layer plasma treatment process, the second N-type work function layer forming process, and the N-type work function layer plasma treatment process are sequentially performed.

In some implementations, the first N-type work function layer forming process and the first N-type work function layer forming process are both used to form an N-type work function layer. A work function range of the material of the N-type work function layer is from 3.9 ev to 4.5 ev, for example, 4 ev, 4.1 ev, or 4.3 ev. The N-type work function layer is made of one or more of TiAl, Mo, MoN, AlN, and TiAlC.

In some implementations, the first P-type work function layer forming process and the first P-type work function layer forming process are both used to form a P-type work function layer. A work function range of the material of the P-type work function layer is from 5.1 ev to 5.5 ev, for example, 5.2 ev, 5.3 ev, or 5.4 ev. The P-type work function layer is made of one or more of TiN, TaN, TaSiN, TaAlN, or TiAlN.

The N-type work function layer plasma treatment process is used to increase the work function value of the N-type work function layer, thereby increasing the threshold voltage of the NMOS device.

The P-type work function layer plasma treatment process is used to increase the work function value of the P-type work function layer, thereby reducing the threshold voltage of the PMOS device, so that the threshold voltage of the NMOS device can also be accordingly increased.

In some implementations, in the step of establishing a second mapping relationship of the threshold voltage interval, a threshold voltage adjustment process corresponding to the first threshold voltage in the NMOS device includes the electric dipole layer forming process, the first N-type work function layer forming process, and the second N-type work function layer forming process. A threshold voltage adjustment process corresponding to the second threshold voltage in the NMOS device includes the electric dipole layer forming process, the first N-type work function layer forming process, the second N-type work function layer forming process, and the N-type work function layer plasma treatment process. A threshold voltage adjustment process corresponding to the third threshold voltage in the NMOS device includes the electric dipole layer forming process, the first P-type work function layer forming process, and the second N-type work function layer forming process. A threshold voltage adjustment process corresponding to the fourth threshold voltage in the NMOS device includes the electric dipole layer forming process, the first P-type work function layer forming process, the second N-type work function layer forming process, and the N-type work function layer plasma treatment process. A threshold voltage adjustment process corresponding to the fifth threshold voltage in the NMOS device includes the first P-type work function layer forming process and the second N-type work function layer forming process. A threshold voltage adjustment process corresponding to the sixth threshold voltage in the NMOS device includes the first P-type work function layer forming process, the second N-type work function layer forming process, and the N-type work function layer plasma treatment process. A threshold voltage adjustment process corresponding to the seventh threshold voltage in the NMOS device includes the first P-type work function layer forming process, the P-type work function layer plasma treatment process, and the second N-type work function layer forming process. A threshold voltage adjustment process corresponding to the eighth threshold voltage in the NMOS device includes the first P-type work function layer forming process, the P-type work function layer plasma treatment process, the second N-type work function layer forming process, and the N-type work function layer plasma treatment process.

It should be noted that the threshold voltage adjustment process corresponding to the first threshold voltage in the NMOS device includes the electric dipole layer forming process, the first N-type work function layer forming process, and the second N-type work function layer forming process, and does not include the first P-type work function layer forming process and the second N-type work function layer forming process. Therefore, during the subsequent process manufacturing, after the first P-type work function layer covering the entire substrate is formed, a first P-type work function layer at a region position used for forming an NMOS device and having a threshold voltage interval of the first threshold voltage is removed through mask etching. In the etching process, the N-type work function layer formed by using the first N-type work function layer forming process serves as an etch stop layer (ESL).

Similarly, after the second P-type work function layer covering the entire substrate is formed, a second P-type work function layer at a region position used for forming an NMOS device and having a threshold voltage interval of the first threshold voltage is removed through mask etching. In the etching process, the N-type work function layer formed by using the first N-type work function layer forming process serves as the etch stop layer.

Similarly, a threshold voltage adjustment process corresponding to the second threshold voltage in the NMOS device includes the electric dipole layer forming process, the first N-type work function layer forming process, and the second N-type work function layer forming process, and the N-type work function layer formed by using the first N-type work function layer forming process also serves as the etch stop layer.

In some implementations, in the step of establishing a second mapping relationship of the threshold voltage interval, a threshold voltage adjustment process corresponding to the first threshold voltage in a PMOS device includes the first P-type work function layer forming process, the second P-type work function layer forming process, and the P-type work function layer plasma treatment process. A threshold voltage adjustment process corresponding to the second threshold voltage in the PMOS device includes the electric dipole layer forming process, the first P-type work function layer forming process, the second P-type work function layer forming process, and the P-type work function layer plasma treatment process. A threshold voltage adjustment process corresponding to the third threshold voltage in the PMOS device includes the first P-type work function layer forming process and the second P-type work function layer forming process. A threshold voltage adjustment process corresponding to the fourth threshold voltage in the PMOS device includes the electric dipole layer forming process, the first P-type work function layer forming process, and the second P-type work function layer forming process. A threshold voltage adjustment process corresponding to the fifth threshold voltage in the PMOS device includes the first P-type work function layer forming process and the P-type work function layer plasma treatment process. A threshold voltage adjustment process corresponding to the sixth threshold voltage in the PMOS device includes the electric dipole layer forming process, the first P-type work function layer forming process, and the P-type work function layer plasma treatment process. A threshold voltage adjustment process corresponding to the seventh threshold voltage in the PMOS device includes the first P-type work function layer forming process. A threshold voltage adjustment process corresponding to the eighth threshold voltage in the PMOS device includes the electric dipole layer forming process and the first P-type work function layer forming process.

It should be noted that the foregoing threshold voltage adjustment process is obtained when the substrate of the MOS device is made of Si. When the substrate of the PMOS device is made of SiGe, the threshold voltage of the PMOS device will integrally decrease. Therefore, in order to make the threshold voltage adjustment process cause, under the action of the total threshold voltage offset, the threshold voltage of the PMOS device to be in the corresponding threshold voltage interval, the threshold voltage adjustment process corresponding to the PMOS device further includes the second N-type work function layer forming process, that is, the threshold voltage adjustment process corresponding to each threshold voltage interval includes the second N-type work function layer forming process.

The threshold voltage adjustment process corresponding to the PMOS device further includes the second N-type work function layer forming process, to increase the work function value of the PMOS device, thereby reducing the threshold voltage.

Therefore, for the PMOS device, the second N-type work function layer forming process may serve as the selected adjustment process, or may serve as the unselected adjustment process.

Still referring to FIG. 4, step S24 of establishing a second mapping relationship of the threshold voltage interval is performed, the second mapping relationship being a correspondence between the threshold voltage interval in the first mapping relationship and a threshold voltage adjustment process formed by at least one adjustment process selected from the preset process flow, the threshold voltage adjustment process causing the threshold voltage to be in the corresponding threshold voltage interval under the action of a total threshold voltage offset.

Therefore, through the combination mode of different adjustment processes, threshold voltage adjustment processes corresponding to the MOS device type and the corresponding threshold voltage interval can be obtained to meet the requirements of forming a multi-threshold voltage device, thereby improving the applicability of the method for adjusting the threshold voltage and further reducing the difficulty in adjusting the threshold voltage.

The second mapping relationship is a correspondence between the threshold voltage interval in the first mapping relationship and the threshold voltage adjustment process formed by at least one adjustment process selected from the preset process flow. Therefore, once the type of to-beformed MOS device and the corresponding threshold voltage interval are determined during the process manufacturing, the corresponding threshold voltage adjustment process may be obtained by querying the first mapping relationship of the threshold voltage interval and the second mapping relationship of the threshold voltage interval configured In some implementations, thereby significantly reducing the difficulty in obtaining the corresponding threshold voltage adjustment process, and correspondingly reducing the difficulty in adjusting the threshold voltage.

Referring to Table 2, a first mapping relationship of the threshold voltage interval and a second mapping relationship of the threshold voltage interval of this embodiment are shown.

ing method provided in the embodiments of the present disclosure through the process manufacturing method in the form of loading a program.

Figure 5:
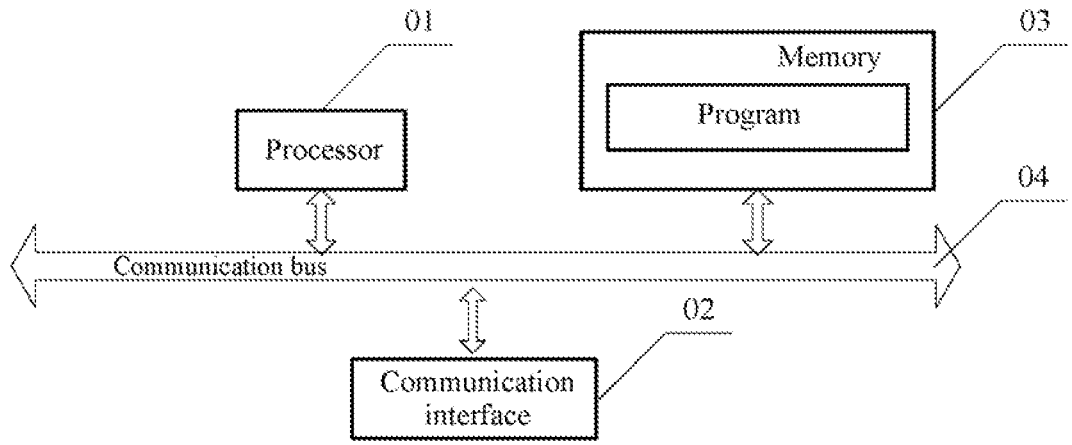
FIG. 5 is a structural hardware diagram of one form of a device according to the present disclosure.

Referring to FIG. 5, FIG. 5 is a structural hardware diagram of a device according to an embodiment of the present disclosure. The device of this embodiment includes: at least one processor 01, at least one communication interface 02, at least one memory 03, and at least one communication bus 04.

In some implementations, there is at least one processor 01, at least one communication interface 02, at least one memory 03, and at least one communication bus 04, and the processor 01, the communication interface 02, and the

TABLE 2

| Preset process flow | MOS device type | | | | | | | | | | | | | | | |
|---|---|---|---|---|---|---|---|---|---|---|---|---|---|---|---|---|
| | NMOS | | | | | | | | PMOS | | | | | | | |
| Dipole | ○1 | ○1 | ○1 | ○1 | X | X | X | X | X | ○2 | X | ○2 | X | ○2 | X | ○2 |
| ESL (NWF-1) | ○ | ○ | X | X | X | X | X | X | X | X | X | X | X | X | X | X |
| PWF-1 | X | X | ○ | ○ | ○ | ○ | ○ | ○ | ○ | ○ | ○ | ○ | ○ | ○ | ○ | ○ |
| PWF-2 | X | X | X | X | X | X | X | X | ○ | ○ | ○ | ○ | X | X | X | X |
| plasma-1 | X | X | X | X | X | X | ○ | ○ | ○ | ○ | X | X | ○ | ○ | X | X |
| NWF-2 | ○ | ○ | ○ | ○ | ○ | ○ | ○ | ○ | Δ | Δ | Δ | Δ | Δ | Δ | Δ | Δ |
| plasma-2 | X | ○ | X | ○ | X | ○ | X | ○ | X | X | X | X | X | X | X | X |
| Threshold voltage interval | ESLVT | SLVT | ULVT | LVT | SVT | HVT | UHVT | SHVT | ESLVT | SLVT | ULVT | LVT | SVT | HVT | UHVT | SHVT |

It should be noted that "○" in Table 2 indicates a selected adjustment process in the second mapping relationship, "X" in Table 2 indicates an unselected adjustment process in the second mapping relationship, "O1" and "O2" in Table 2 indicate different doping layer thicknesses of the electric dipole layer forming processes corresponding to an NMOS and a PMOS, and "Δ" in Table 2 indicates either selected or unselected adjustment processes in the second mapping relationship.

It should be further noted that "Dipole" in Table 2 indicates an electric dipole layer forming process, "ESL (NWF-1)" in Table 2 indicates a first N-type work function layer forming process, "PWF-1" in Table 2 indicates a first P-type work function layer forming process, "PWF-2" in Table 2 indicates a second P-type work function layer forming process, "plasma-1" in Table 2 indicates a P-type work function layer plasma treatment process, "NWF-2" in Table 2 indicates a second N-type work function layer forming process, and "plasma-2" in Table 2 indicates an N-type work function layer plasma treatment process.

It may be learned from the foregoing description that when the substrate of the PMOS device is made of Si, the second N-type work function layer forming process is not included in the threshold voltage adjustment process corresponding to the PMOS device. When the substrate of the PMOS device is made of SiGe, the threshold voltage adjustment process corresponding to the PMOS device includes the second N-type work function layer forming process. Therefore, for the PMOS device, the second N-type work function layer forming process may serve as a selected adjustment process, or may serve as an unselected adjustment process.

Another form of the present disclosure further provides a device. The device may implement the process manufacturing method provided in the embodiments of the present disclosure through the process manufacturing method in the form of loading a program.

memory 03 complete communication with each other through the communication bus 04.

The communication interface 02 may be an interface of a communication module for network communication, for example, an interface of a GSM module.

The processor 01 may be a central processing unit (CPU), or an application specific integrated circuit (ASIC), or one or more integrated circuits configured to implement the process manufacturing method in this embodiment.

The memory 03 may include a high-speed RAM memory, or may further include a non-volatile memory, for example, at least one magnetic disk memory.

The memory 03 stores one or more computer instructions, the one or more computer instructions being executed by the processor 01 to implement the process manufacturing method provided in the embodiments of the present disclosure.

It should be noted that the foregoing terminal device for implementation may further include other devices (not shown) that may not be necessary for the disclosure content of the embodiments and implementations of the present disclosure. Since the other devices may not be necessary for understanding the disclosure content of the embodiments and implementations of the present disclosure, the devices are not to be described one by one in the embodiments of the present disclosure.

The present disclosure further provides a storage medium, where the storage medium stores one or more computer instructions, the one or more computer instructions configured to be executed by a processor to implement the process manufacturing method provided in the embodiments of the present disclosure.

In process manufacturing methods provided in the embodiments and implementations of the present disclosure, according to the type of to-be-formed MOS device and the corresponding threshold voltage interval, a corresponding threshold voltage adjustment process is obtained by querying a pre-configured first mapping relationship of the threshold voltage interval and a second mapping relationship of the threshold voltage interval, and then a process flow is established according to the corresponding threshold voltage adjustment process. The first mapping relationship is a mapping relationship between the threshold voltage interval and the MOS device type, and the second mapping relationship is a correspondence between a threshold voltage interval in the first mapping relationship and a threshold voltage adjustment process formed by at least one adjustment process selected from a preset process flow, the threshold voltage adjustment process causing a threshold voltage to be in the corresponding threshold voltage interval under the action of a total threshold voltage offset. Therefore, the corresponding threshold voltage adjustment process may be obtained through querying, and the corresponding threshold voltage adjustment process may be obtained through a combination mode of different adjustment processes, so that any MOS device with required threshold voltages can be formed through the process manufacturing method, thereby further reducing the difficulty in adjusting the threshold voltage.

The implementations of the present disclosure described above are a combination of elements and features of the present disclosure. The elements or features may be considered selective unless otherwise mentioned. Each element or feature may be practiced without being combined with other elements or features. In addition, the implementations of the present disclosure may be configured by combining part of elements and/or features. The order of operations described in the implementations of the present disclosure may be rearranged. Some configurations of any implementation may be included in another implementation and may be replaced with corresponding configurations of another implementation. It is obvious to a person skilled in the art that claims in the appended claims that do not have a clear reference relationship with each other may be combined into an implementation of the present disclosure, or may be included as new claims in amendments after the filing of this application.

The implementations of the present disclosure can be implemented by various means such as hardware, firmware, software, or a combination thereof. In a hardware configuration mode, the method according to the exemplary embodiments of the present disclosure may be implemented by one or more application specific integrated circuits (ASICs), digital signal processors (DSPs), digital signal processing devices (DSPDs), programmable logic devices (PLD), field programmable gate arrays (FPGAs), processors, controllers, microcontrollers, microprocessors, and the like.

In a firmware or software configuration mode, the implementations of the present disclosure may be implemented in the form of modules, processes, functions, and the like. Software code may be stored in a memory unit and executed by a processor. The memory unit is located inside or outside the processor and can send data to and receive data from the processor by various known means.

The foregoing descriptions of the disclosed embodiments and implementations enable a person skilled in the art to implement or use the present disclosure. Various modifications to these embodiments and implementations are obvious to a person skilled in the art, the general principles defined in the present disclosure may be implemented in other embodiments and implementations without departing from the spirit and scope of the present disclosure. Therefore, the present disclosure is not limited to these embodiments and implementations illustrated in the present disclosure, but needs to conform to the broadest scope consistent with the principles and novel features disclosed in the present disclosure.

Although the present disclosure is disclosed as above, the present disclosure is not limited thereto. A person skilled in the art may make variations and modifications without departing from the spirit and scope of the present disclosure. Therefore, the protection scope of the present disclosure should be subject to the claims.

What is claimed is:

1. A process manufacturing method, comprising:
   determining a type of to-be-formed MOS device and a corresponding threshold voltage interval;
   obtaining, according to the MOS device type and the corresponding threshold voltage interval, a corresponding threshold voltage adjustment process by querying a pre-configured first mapping relationship of the threshold voltage interval and a second mapping relationship of the threshold voltage interval;
   establishing a process flow according to the corresponding threshold voltage adjustment process, wherein:
   the first mapping relationship is a mapping relationship between the threshold voltage interval and the MOS device type, and
   the second mapping relationship is a correspondence between the threshold voltage interval in the first mapping relationship and a threshold voltage adjustment process formed by at least one adjustment process selected from a preset process flow, the threshold voltage adjustment process causing a threshold voltage to be in the corresponding threshold voltage interval under the action of a total threshold voltage offset.

2. The process manufacturing method according to claim 1, wherein in the step of establishing a process flow, the process flow further comprises an interface layer forming process and a high-k gate dielectric layer forming process that are sequentially performed, where the high-k gate dielectric layer forming process is performed before the adjustment process.

3. The process manufacturing method according to claim 1, wherein:
   in the step of determining a type of to-be-formed MOS device and a corresponding threshold voltage interval, the MOS device type comprises one or more of an NMOS device and a PMOS device; and
   the threshold voltage interval comprises at least one of:
   a first threshold voltage, a second threshold voltage, a third threshold voltage, a fourth threshold voltage, a fifth threshold voltage, a sixth threshold voltage, a seventh threshold voltage, or an eighth threshold voltage,
   where threshold voltages corresponding to the first threshold voltage, the second threshold voltage, the third threshold voltage, the fourth threshold voltage, the fifth threshold voltage, the sixth threshold voltage, the seventh threshold voltage, and the eighth threshold voltage increase progressively.

4. The process manufacturing method according to claim 1, wherein in the step of obtaining a corresponding threshold voltage adjustment process by querying a pre-configured first mapping relationship of the threshold voltage interval and a second mapping relationship of the threshold voltage interval, in the second mapping relationship of the threshold voltage interval, the adjustment process comprises an electric dipole layer forming process, a work function layer forming process, and a work function layer plasma treatment process.

5. The process manufacturing method according to claim 4, wherein:
the adjustment process in the preset process flow comprises: the electric dipole layer forming process, a first N-type work function layer forming process, a first P-type work function layer forming process, a second P-type work function layer forming process, a P-type work function layer plasma treatment process, a second N-type work function layer forming process, and an N-type work function layer plasma treatment process,
the first N-type work function layer forming process, the first P-type work function layer forming process, the second P-type work function layer forming process, and the second N-type work function layer forming process serving as the work function layer forming process, and the P-type work function layer plasma treatment process and the N-type work function layer plasma treatment process serving as the work function layer plasma treatment process.

6. The process manufacturing method according to claim 5, wherein:
in the step of determining a type of to-be-formed MOS device and a corresponding threshold voltage interval, the MOS device is an NMOS device, a threshold voltage interval corresponding to the NMOS device being a first threshold voltage; and
in the step of obtaining a corresponding threshold voltage adjustment process, the corresponding threshold voltage adjustment process comprises the electric dipole layer forming process, the first N-type work function layer forming process, and the second N-type work function layer forming process; or
in the step of determining a type of to-be-formed MOS device and a corresponding threshold voltage interval, the MOS device is an NMOS device, a threshold voltage interval corresponding to the NMOS device being a second threshold voltage; and
in the step of obtaining a corresponding threshold voltage adjustment process, the corresponding threshold voltage adjustment process comprises the electric dipole layer forming process, the first N-type work function layer forming process, the second N-type work function layer forming process, and the N-type work function layer plasma treatment process; or
in the step of determining a type of to-be-formed MOS device and a corresponding threshold voltage interval, the MOS device is an NMOS device, a threshold voltage interval corresponding to the NMOS device being a third threshold voltage; and
in the step of obtaining a corresponding threshold voltage adjustment process, the corresponding threshold voltage adjustment process comprises the electric dipole layer forming process, the first P-type work function layer forming process, and the second N-type work function layer forming process; or
in the step of determining a type of to-be-formed MOS device and a corresponding threshold voltage interval, the MOS device is an NMOS device, a threshold voltage interval corresponding to the NMOS device being a fourth threshold voltage; and
in the step of obtaining a corresponding threshold voltage adjustment process, the corresponding threshold voltage adjustment process comprises the electric dipole layer forming process, the first P-type work function layer forming process, the second N-type work function layer forming process, and the N-type work function layer plasma treatment process; or
in the step of determining a type of to-be-formed MOS device and a corresponding threshold voltage interval, the MOS device is an NMOS device, a threshold voltage interval corresponding to the NMOS device being a fifth threshold voltage; and
in the step of obtaining a corresponding threshold voltage adjustment process, the corresponding threshold voltage adjustment process comprises the first P-type work function layer forming process and the second N-type work function layer forming process; or
in the step of determining a type of to-be-formed MOS device and a corresponding threshold voltage interval, the MOS device is an NMOS device, a threshold voltage interval corresponding to the NMOS device being a sixth threshold voltage; and
in the step of obtaining a corresponding threshold voltage adjustment process, the corresponding threshold voltage adjustment process comprises the first P-type work function layer forming process, the second N-type work function layer forming process, and the N-type work function layer plasma treatment process; or
in the step of determining a type of to-be-formed MOS device and a corresponding threshold voltage interval, the MOS device is an NMOS device, a threshold voltage interval corresponding to the NMOS device being a seventh threshold voltage; and
in the step of obtaining a corresponding threshold voltage adjustment process, the corresponding threshold voltage adjustment process comprises the first P-type work function layer forming process, the P-type work function layer plasma treatment process, and the N-type work function layer forming process; or
in the step of determining a type of to-be-formed MOS device and a corresponding threshold voltage interval, the MOS device is an NMOS device, a threshold voltage interval corresponding to the NMOS device being an eighth threshold voltage; and
in the step of obtaining a corresponding threshold voltage adjustment process, the corresponding threshold voltage adjustment process comprises the first P-type work function layer forming process, the P-type work function layer plasma treatment process, the second N-type work function layer forming process, and the N-type work function layer plasma treatment process.

7. The process manufacturing method according to claim 5, wherein in the step of determining a type of to-be-formed MOS device and a corresponding threshold voltage interval, the MOS device is a PMOS device, a threshold voltage interval corresponding to the PMOS device being a first threshold voltage; and
in the step of obtaining a corresponding threshold voltage adjustment process, the corresponding threshold voltage adjustment process comprises the first P-type work function layer forming process, the second P-type work function layer forming process, and the P-type work function layer plasma treatment process; or
in the step of determining a type of to-be-formed MOS device and a corresponding threshold voltage interval, the MOS device is a PMOS device, a threshold voltage interval corresponding to the PMOS device being a second threshold voltage; and
in the step of obtaining a corresponding threshold voltage adjustment process, the corresponding threshold voltage adjustment process comprises the electric dipole layer forming process, the first P-type work function layer forming process, the second P-type work function layer forming process, and the P-type work function layer plasma treatment process; or in the step of determining a type of to-be-formed MOS device and a corresponding threshold voltage interval, the MOS device is a PMOS device, a threshold voltage interval corresponding to the PMOS device being a third threshold voltage; and in the step of obtaining a corresponding threshold voltage adjustment process, the corresponding threshold voltage adjustment process comprises the first P-type work function layer forming process and the second P-type work function layer forming process; or in the step of determining a type of to-be-formed MOS device and a corresponding threshold voltage interval, the MOS device is a PMOS device, a threshold voltage interval corresponding to the PMOS device being a fourth threshold voltage; and in the step of obtaining a corresponding threshold voltage adjustment process, the corresponding threshold voltage adjustment process comprises the electric dipole layer forming process, the first P-type work function layer forming process, and the second P-type work function layer forming process; or in the step of determining a type of to-be-formed MOS device and a corresponding threshold voltage interval, the MOS device is a PMOS device, a threshold voltage interval corresponding to the PMOS device being a fifth threshold voltage; and in the step of obtaining a corresponding threshold voltage adjustment process, the corresponding threshold voltage adjustment process comprises the first P-type work function layer forming process and the P-type work function layer plasma treatment process; or in the step of determining a type of to-be-formed MOS device and a corresponding threshold voltage interval, the MOS device is a PMOS device, a threshold voltage interval corresponding to the PMOS device being a sixth threshold voltage; and in the step of obtaining a corresponding threshold voltage adjustment process, the corresponding threshold voltage adjustment process comprises the electric dipole layer forming process, the first P-type work function layer forming process, and the P-type work function layer plasma treatment process; or in the step of determining a type of to-be-formed MOS device and a corresponding threshold voltage interval, the MOS device is a PMOS device, a threshold voltage interval corresponding to the PMOS device being a seventh threshold voltage; and in the step of obtaining a corresponding threshold voltage adjustment process, the corresponding threshold voltage adjustment process comprises the first P-type work function layer forming process; or in the step of determining a type of to-be-formed MOS device and a corresponding threshold voltage interval, the MOS device is a PMOS device, a threshold voltage interval corresponding to the PMOS device being an eighth threshold voltage; and in the step of obtaining a corresponding threshold voltage adjustment process, the corresponding threshold voltage adjustment process comprises the electric dipole layer forming process and the first P-type work function layer forming process.

8. The process manufacturing method according to claim 7, wherein a substrate of the PMOS device comprises SiGe, and the threshold voltage adjustment process corresponding to the PMOS device further comprises the second N-type work function layer forming process.

9. The process manufacturing method according to claim 5, wherein:

in the step of determining a type of to-be-formed MOS device and a corresponding threshold voltage interval, the MOS device is an NMOS device; and in the electric dipole layer forming process, a threshold voltage is adjusted by using a magnesium oxide layer or a lanthanum oxide layer; or in the step of determining a type of to-be-formed MOS device and a corresponding threshold voltage interval, the MOS device is a PMOS device; and in the electric dipole layer forming process, a threshold voltage is adjusted by using an aluminum oxide layer.

10. The process manufacturing method according to claim 5, wherein in the work function layer plasma treatment process, a threshold voltage is adjusted through plasma treatment under the condition of at least one of a nitrogen-containing gas, an oxygen-containing gas, or a fluorine-containing gas.

11. A method for adjusting a threshold voltage, comprising:

setting at least one threshold voltage interval;

establishing a first mapping relationship of a threshold voltage interval of the at least one threshold voltage interval, the first mapping relationship being a mapping relationship between the threshold voltage interval of the at least one threshold voltage interval and a MOS device type;

setting a preset process flow, the preset process flow comprising adjustment processes performed during manufacturing of a MOS device, where each of the adjustment processes has a corresponding threshold voltage offset; and establishing a second mapping relationship of the threshold voltage interval, the second mapping relationship being a correspondence between the threshold voltage interval in the first mapping relationship and a threshold voltage adjustment process formed by at least one adjustment process selected from the preset process flow, where the threshold voltage adjustment process causes the threshold voltage to be in a corresponding threshold voltage interval under an action of a total threshold voltage offset.

12. The method for adjusting the threshold voltage according to claim 11, wherein in the step of setting at least one threshold voltage interval, there are a plurality of threshold voltage intervals; and setting the plurality of threshold voltage intervals comprises:

for the same MOS device type of MOS devices, providing a total threshold voltage interval of the MOS device; and dividing the total threshold voltage interval into a plurality of subintervals, the subintervals being in a one-to-one correspondence with the threshold voltage interval.

13. The method for adjusting the threshold voltage according to claim 11, wherein in the step of setting at least one threshold voltage interval, for the same MOS device type of MOS devices, there are 8 to 16 threshold voltage intervals.

14. The method for adjusting the threshold voltage according to claim 11, wherein:
in the step of setting at least one threshold voltage interval, for the same MOS device type of MOS devices, there are 8 threshold voltage intervals, the threshold voltage interval comprising a first threshold voltage, a second threshold voltage, a third threshold voltage, a fourth threshold voltage, a fifth threshold voltage, a sixth threshold voltage, a seventh threshold voltage, and an eighth threshold voltage, where the threshold voltages corresponding to the first threshold voltage, the second threshold voltage, the third threshold voltage, the fourth threshold voltage, the fifth threshold voltage, the sixth threshold voltage, the seventh threshold voltage, and the eighth threshold voltage increase progressively.

15. The method for adjusting the threshold voltage according to claim 11, wherein in the step of establishing the first mapping relationship of the threshold voltage interval, the MOS device type comprises an NMOS device and a PMOS device.

16. The method for adjusting the threshold voltage according to claim 11, wherein in the step of setting a preset process flow, the adjustment process is divided into a first type adjustment process and a second type adjustment process, where a threshold voltage offset corresponding to the first type adjustment process is greater than a threshold voltage offset corresponding to the second type adjustment process.

17. The method for adjusting the threshold voltage according to claim 16, wherein:
the first type adjustment process comprises an electric dipole layer forming process, and
the second type adjustment process comprises a work function layer forming process and a work function layer plasma treatment process.

18. The method for adjusting the threshold voltage according to claim 17, wherein:
the adjustment process in the preset process flow comprises:
the electric dipole layer forming process,
a first N-type work function layer forming process,
a first P-type work function layer forming process,
a second P-type work function layer forming process,
a P-type work function layer plasma treatment process,
a second N-type work function layer forming process, and
an N-type work function layer plasma treatment process, and
the first N-type work function layer forming process, the first P-type work function layer forming process, the second P-type work function layer forming process, and the second N-type work function layer forming process serve as the work function layer forming process, and the P-type work function layer plasma treatment process and the N-type work function layer plasma treatment process serve as the work function layer plasma treatment process.

19. The method for adjusting the threshold voltage according to claim 18, wherein:
in the step of setting at least one threshold voltage interval, the threshold voltage interval comprises a first threshold voltage, a second threshold voltage, a third threshold voltage, a fourth threshold voltage, a fifth threshold voltage, a sixth threshold voltage, a seventh threshold voltage, and an eighth threshold voltage, where the threshold voltages corresponding to the first threshold voltage, the second threshold voltage, the third threshold voltage, the fourth threshold voltage, the fifth threshold voltage, the sixth threshold voltage, the seventh threshold voltage, and the eighth threshold voltage increase progressively;
in the step of establishing a second mapping relationship of the threshold voltage interval, a threshold voltage adjustment process corresponding to the first threshold voltage in the NMOS device comprises the electric dipole layer forming process, the first N-type work function layer forming process, and the second N-type work function layer forming process;
a threshold voltage adjustment process corresponding to the second threshold voltage in the NMOS device comprises the electric dipole layer forming process, the first N-type work function layer forming process, the second N-type work function layer forming process, and the N-type work function layer plasma treatment process;
a threshold voltage adjustment process corresponding to the third threshold voltage in the NMOS device comprises the electric dipole layer forming process, the first P-type work function layer forming process, and the second N-type work function layer forming process;
a threshold voltage adjustment process corresponding to the fourth threshold voltage in the NMOS device comprises the electric dipole layer forming process, the first P-type work function layer forming process, the second N-type work function layer forming process, and the N-type work function layer plasma treatment process;
a threshold voltage adjustment process corresponding to the fifth threshold voltage in the NMOS device comprises the first P-type work function layer forming process and the second N-type work function layer forming process;
a threshold voltage adjustment process corresponding to the sixth threshold voltage in the NMOS device comprises the first P-type work function layer forming process, the second N-type work function layer forming process, and the N-type work function layer plasma treatment process;
a threshold voltage adjustment process corresponding to the seventh threshold voltage in the NMOS device comprises the first P-type work function layer forming process, the P-type work function layer plasma treatment process, and the second N-type work function layer forming process; and
a threshold voltage adjustment process corresponding to the eighth threshold voltage in the NMOS device comprises the first P-type work function layer forming process, the P-type work function layer plasma treatment process, the second N-type work function layer forming process, and the N-type work function layer plasma treatment process.

20. The method for adjusting the threshold voltage according to claim 18, wherein:
in the step of setting at least one threshold voltage interval, the threshold voltage interval comprises a first threshold voltage, a second threshold voltage, a third threshold voltage, a fourth threshold voltage, a fifth threshold voltage, a sixth threshold voltage, a seventh threshold voltage, and an eighth threshold voltage, where threshold voltages corresponding to the first threshold voltage, the second threshold voltage, the third threshold voltage, the fourth threshold voltage, the fifth threshold voltage, the sixth threshold voltage, the seventh threshold voltage, and the eighth threshold voltage increase progressively;

in the step of establishing a second mapping relationship of the threshold voltage interval, a threshold voltage adjustment process corresponding to the first threshold voltage in a PMOS device comprises the first P-type work function layer forming process, the second P-type work function layer forming process, and the P-type work function layer plasma treatment process;

a threshold voltage adjustment process corresponding to the second threshold voltage in the PMOS device comprises the electric dipole layer forming process, the first P-type work function layer forming process, the second P-type work function layer forming process, and the P-type work function layer plasma treatment process;

a threshold voltage adjustment process corresponding to the third threshold voltage in the PMOS device comprises the first P-type work function layer forming process and the second P-type work function layer forming process;

a threshold voltage adjustment process corresponding to the fourth threshold voltage in the PMOS device comprises the electric dipole layer forming process, the first P-type work function layer forming process, and the second P-type work function layer forming process;

a threshold voltage adjustment process corresponding to the fifth threshold voltage in the PMOS device comprises the first P-type work function layer forming process and the P-type work function layer plasma treatment process;

a threshold voltage adjustment process corresponding to the sixth threshold voltage in the PMOS device comprises the electric dipole layer forming process, the first P-type work function layer forming process, and the P-type work function layer plasma treatment process;

a threshold voltage adjustment process corresponding to the seventh threshold voltage in the PMOS device comprises the first P-type work function layer forming process; and a threshold voltage adjustment process corresponding to the eighth threshold voltage in the PMOS device comprises the electric dipole layer forming process and the first P-type work function layer forming process.

21. The method for adjusting the threshold voltage according to claim 20, wherein a substrate of the PMOS device is made of SiGe, and the threshold voltage adjustment process corresponding to the PMOS device further comprises the second N-type work function layer forming process.

22. The method for adjusting the threshold voltage according to claim 16, wherein the threshold voltage offset of the first type adjustment process is 150 mV to 350 mV, and the threshold voltage offset of the second type adjustment process is 40 mV to 140 mV.

23. The method for adjusting the threshold voltage according to claim 17, wherein:
the MOS device type is an NMOS device;
in the electric dipole layer forming process, the threshold voltage is adjusted using a magnesium oxide layer or a lanthanum oxide layer; or
the MOS device type is a PMOS device;
in the electric dipole layer forming process, the threshold voltage is adjusted using an aluminum oxide layer.

24. The method for adjusting the threshold voltage according to claim 17, wherein in the work function layer plasma treatment process, the threshold voltage is adjusted through plasma treatment under the condition of one or more of a nitrogen-containing gas, an oxygen-containing gas, and a fluorine-containing gas.

25. A device, comprising: at least one memory and at least one processor, the memory storing one or more computer instructions, wherein the one or more computer instructions are executed by the processor to implement the process manufacturing method according to claim 1.

26. A storage medium, wherein the storage medium stores one or more computer instructions, the one or more computer instructions executable by at least one processor to cause the processor to implement the process manufacturing method according to claim 1.

* * * * *